(12) United States Patent
Boyle et al.

(10) Patent No.: US 6,647,259 B1
(45) Date of Patent: Nov. 11, 2003

(54) METHOD FOR LIMITING THE NUMBER OF SIMULTANEOUS CALL FORWARDING ATTEMPTS IN A CELLULAR COMMUNICATION SYSTEM

(75) Inventors: Patrick Joseph Boyle, Naperville, IL (US); Mark Alan McCormick, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 470 days.

(21) Appl. No.: 09/650,794

(22) Filed: Aug. 30, 2000

(51) Int. Cl.[7] ................................................ H04M 3/42
(52) U.S. Cl. ............... 455/417; 455/414.1; 379/212.01; 379/211.01
(58) Field of Search ................................. 455/414, 415, 455/417, 422; 379/212.01, 211.01

(56) References Cited

U.S. PATENT DOCUMENTS 5,579,375 A * 11/1996 Ginter
5,790,638 A * 8/1998 Bertacchi
6,473,611 B2 * 10/2002 Hurme \* cited by examiner Primary Examiner—Nguyen T. Vo
Assistant Examiner—Huy D Nguyen
(74) Attorney, Agent, or Firm—John B. MacIntyre

(57) ABSTRACT

The present invention provides a method for limiting the number of simultaneous call forwarding attempts for a mobile unit. A call is made for a mobile unit. The call request is sent to the MSC associated with the mobile unit. When the mobile unit is not currently active at the MSC, the MSC sends a location request to an SCP. The SCP responds with a return message that includes a temporary location directory number (TLDN) and an indicator. The MSC checks the current number of simultaneous call forwarding attempts being made for the mobile unit. If the current number of simultaneous call forwarding attempts exceeds a threshold, the MSC does not forward the call. If the number of simultaneous attempts does not exceed a threshold, the MSC forwards the call to the mobile unit by sending it to the TLDN.

19 Claims, 5 Drawing Sheets

400

METHOD FOR LIMITING THE NUMBER OF SIMULTANEOUS CALL FORWARDING ATTEMPTS IN A CELLULAR COMMUNICATION SYSTEM

FIELD OF THE INVENTION

The present invention relates generally to communication systems, and more particularly to a method for limiting the number of simultaneous call forwarding attempts in a cellular system.

BACKGROUND OF THE INVENTION

In cellular communication systems, a mobile unit registers with a host wireless system. The host wireless system provides service to the mobile unit while the mobile unit is within the coverage area of the host wireless system.

The mobile unit can roam to a visited wireless system. Roaming refers to a mobile unit being serviced by a wireless system that is not its home wireless system.

When a call comes in for a mobile unit, the call request is routed to the host wireless system. If the mobile unit is not active at the host wireless system, the host wireless system sends a location request to a Service Control Point (SCP). The SCP is coupled to the Home Location Register (HLR), which is a database that contains information relating to the mobile units in the communication system. The HLR could also be an integrated HLR on a Mobile Switching Center (MSC).

The SCP typically responds to the location request with a return message that includes a call forwarding number and an indicator. The indicator gives the status of the mobile unit, and the call forwarding number is the number to which the MSC should direct the incoming call. For example, if the indicator indicates that the mobile unit is out of service, the call forwarding number may be the directory number of the user's voice mail box. In this manner, the MSC will route the call to the forwarding number, which in this example is the user's voice mail.

Problems can arise when the MSC tries to forward a plurality of calls simultaneously. The simultaneous call forwarding can bog down the system and consume multiple system resources. This can occur, for instance, when a user is being called by many users substantially simultaneously. For example, if a phone-in-contest is announced on a radio station, tens or even hundreds of calls can be made to the call in number substantially simultaneously. In this scenario, the MSC will send a location request to the HLR. Since the phone will be busy once it picks up the first call, the HLR will return an indicator of busy with a predetermined forwarding number, which may be a voice mail box. If tens or hundreds of calls are arriving, the number of call forwarding attempts will increase dramatically, which could inundate the system, making it unusable for other users until the call forwarding attempts are completely dealt with.

Another example of a problem situation can arise when a first mobile unit has forwarded calls to a second mobile unit, which has forwarded its calls to the first mobile unit. In this scenario, when the first and second mobile units are not responding to calls, a call that comes in for the first mobile unit will be sent by the MSC to the HLR. The HLR will send back a location return request message to the MSC with an indicator that the first mobile unit is not responding, and with a forwarding number of the second mobile unit. The MSC will then forward the call to the second mobile unit. The HLR will return a location return request message to the MSC of the second mobile unit with an indicator that the mobile unit cannot be reached and a forwarding number of the first mobile unit. The MSC will then forward the call back to the mobile unit. This process, an endless recursive loop, could conceivably continue until all system resources are utilized.

Therefore, a need exists for a method for limiting the number of simultaneous call forwarding attempts for a mobile unit in a cellular communication system.

SUMMARY OF THE INVENTION

It is an object of the present invention to provide a method for limiting the number of simultaneous call forwarding attempts for a mobile unit. As used herein, the term simultaneous call forwarding attempts refers to concurrent call forwarding attempts for a mobile user, such that one or more call forwarding attempts are active for the mobile user at the same time. When a call comes in for a mobile unit, the MSC associated with the mobile unit at the host wireless system sends a location request message to a Service Control Point (SCP). The SCP checks a Home Location Registry (HLR) for the status of the mobile unit. The SCP sends a location return result message to the MSC. The location return result message includes an indicator of the status of the mobile unit and a forwarding number.

In accordance with the present invention, the MSC will check whether it should forward the call. The MSC will determine how many simultaneous call forwarding attempts are presently associated with this mobile unit.

If the number of simultaneous call forwarding attempts exceeds a threshold, the MSC will not forward the call.

The threshold can be either predetermined or dynamic. In the predetermined case, a threshold value is set for the mobile unit. This can be done by the user of the mobile unit at registration, or can be determined by the system administrator. In the dynamic case, the system sets the threshold based upon the current or estimated system utilization.

DESCRIPTION OF THE PREFERRED EMBODIMENT(S)

Figure 1:
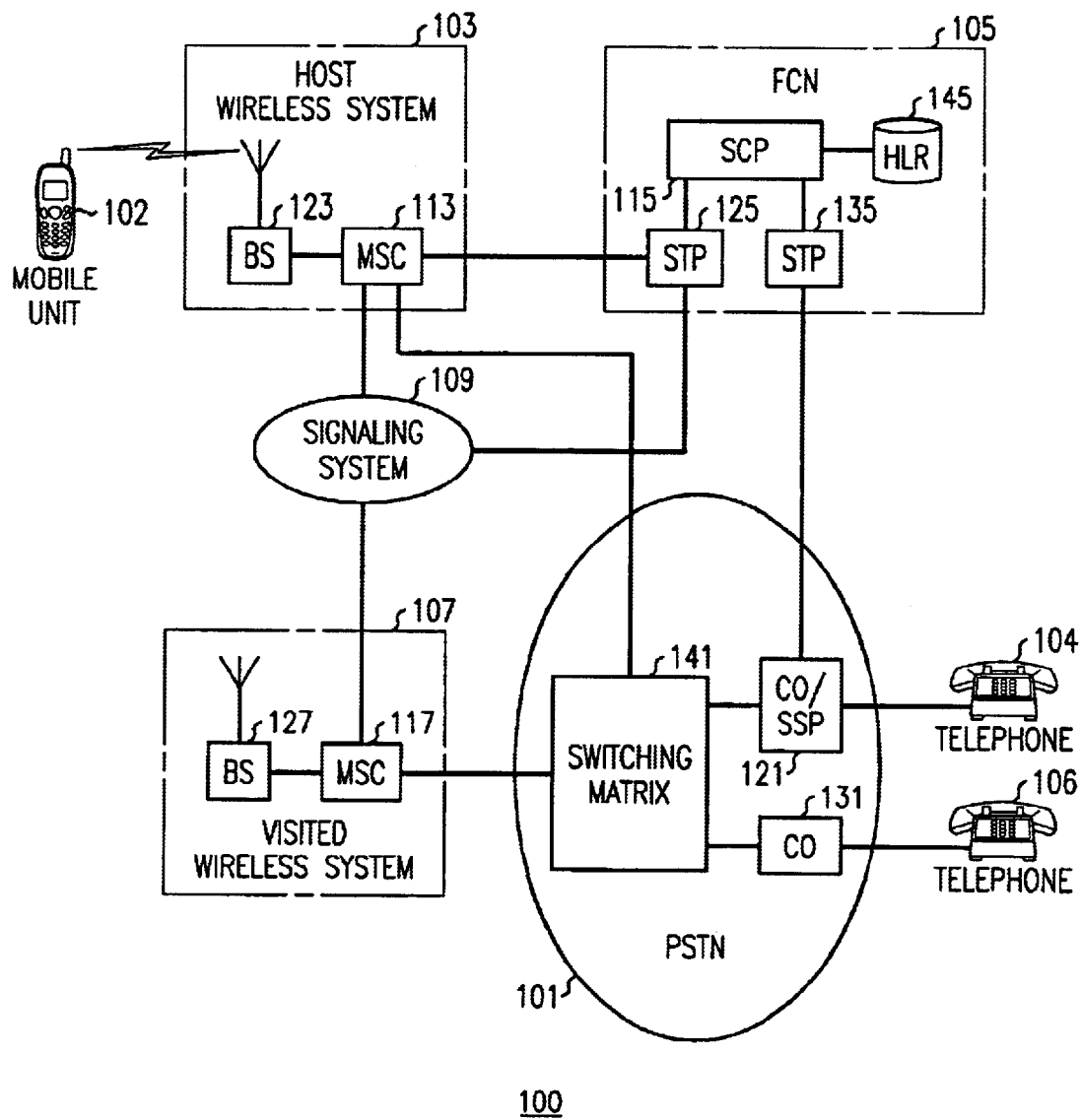
FIG. 1 depicts a communication system in accordance with the preferred embodiment of the present invention.

FIG. 1 depicts a communication system 100 in accordance with the preferred embodiment of the present invention. Communication system 100 includes Public Switched Telephone Network (PSTN) 101, host wireless system 103, Feature Control Network (FCN) 105, visited wireless system 107, and signaling system 109. Mobile unit 102, telephone 104, and telephone 106 are depicted and are in communication with communication system 100.

Mobile unit 102 is a wireless device, preferably a cellular phone. Mobile unit 102 can alternately be a pager, a wireless internet access device, or any other wireless device that communicates over Radio Frequency (RF) with BTS 103.

PSTN 101 includes a Central Office/Service Switching Point (CO/SSP) 121, Central Office (CO) 131, and switching/transmission matrix 141 which includes other switches and interconnections associated with PSTN 101.

Host wireless system 103 is preferably a cellular system that provides service within a predefined geographic region. Host wireless system 103 includes Mobile Switching Center (MSC) 113 and at least one Base Station (BS) 123.

Feature Control Network (FCN) 105 is preferably a conventional Intelligent Network (IN) which includes a Service Control Point (SCP) 115, Signal Transfer Points (STPs) 125 and 135, and a Home Location Registry (HLR) 145. HLR 145 is a database that includes information relating to mobile units that subscribe to host wireless system 103 and visited wireless system 107. The HLR record for mobile unit 102 preferably includes a field that indicates the number of simultaneous call forwarding requests that are permitted for mobile unit 102. Alternately, FCN 105 can be an adjunct processor and database.

Visited wireless system 107 is preferably a cellular system that provides service and coverage within a second coverage area. The second coverage area is a predefined geographic region that is at least partially distinct from that of the home wireless system 103. Visited wireless system 107 includes Mobile Switching Center (MSC) 117 and at least one Base Station (BS) 127.

Signaling system 109 is disposed between host wireless system 103 and visited wireless system 107 and provides for control signals to be sent between the systems. Signaling system 109 also couples visited wireless system 107 with FCN 105.

Figure 2:
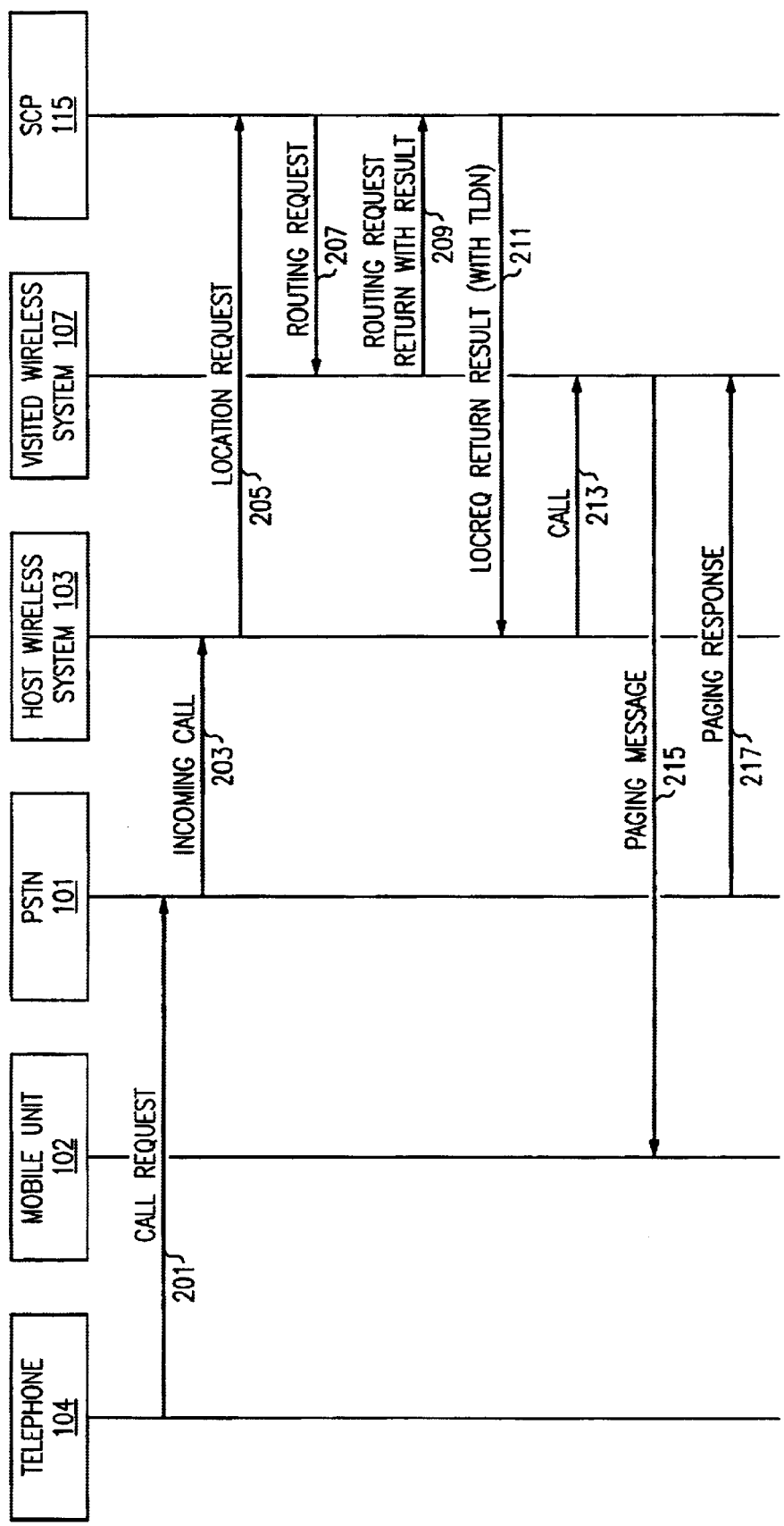
FIG. 2 depicts a ladder diagram of a method for limiting the number of simultaneous call forwarding attempts when a mobile unit responds to a call request in accordance with the preferred embodiment of the present invention.

FIG. 2 depicts a ladder diagram 200 of a method for limiting the number of simultaneous call forwarding attempts when a mobile unit responds to a call request in accordance with the preferred embodiment of the present invention. It should be understood that for each of the ladder diagrams in FIGS. 2–5, the mobile unit will register with the home wireless system. The home wireless system receives the registration and sends a profile of the mobile user to the visited wireless system. The profile is typically obtained from the HLR record for the mobile user, and includes the origination major class for the mobile unit, the terminating major class for the mobile unit, the call forwarding capabilities of the mobile unit, as well as other features associated with the mobile unit.

Telephone 104 sends a call request 201 to PSTN 101 requesting a call for mobile unit 102. Call request 201 can be originated by either a wireline or wireless phone. Call request 201 includes the directory number of mobile unit 102.

PSTN 101 determines the wireless system to which it should send call request 201. Mobile unit 102 subscribed to host wireless system 103, and therefore all call requests for mobile unit 102 are routed to host wireless system 103. PSTN 101 therefore sends incoming call request 203 to host wireless system 103.

Host wireless system 103 then determines if mobile unit 102, which is subscribed to host wireless system 103, is within the coverage area of host wireless system 103. Host wireless system 103 preferably does this by checking HLR 145. If mobile unit 102 is within the coverage area of host wireless system 103, the call is completed between telephone 104 and mobile unit 102.

If mobile unit 102 has roamed to visited wireless system 107, host wireless system 103 sends location request message 205 to SCP 115 located within FCN 105. Location request message 205.is a message that includes the directory number of the mobile unit and an O-MSCID field, which is an identifier of the MSC to which the call came in. Location request message 205 instructs SCP 115 to send the current location of mobile unit 102.

SCP 115 determines that mobile unit 102 has roamed and is now located within the coverage area of visited wireless system 107. SCP 115 then sends routing request message 207 to visited wireless system 107. Routing request message 207 is a message requesting the temporary location directory number of mobile unit 102 while located within visited wireless system 107.

Visited wireless system 107 the sends routing request return result message 209 to SCP 115. Routing request return result message 209 includes the Temporary Location Directory Number (TLDN) for mobile unit 102. The TLDN is a number that is temporarily assigned to mobile unit 102 when mobile unit 102 has roamed to a coverage area outside of the coverage area of its home wireless system.

SCP 115 sends location request return result message 211 to home wireless system 103. Location request return result message 211 includes the TLDN for mobile unit 102.

Host wireless system 103 then determines whether to forward the call to the TLDN. To do this, host wireless system 103 determines the current number of simultaneous call forwarding attempts for mobile unit 102. This is preferably done by retrieving a value that is stored at host wireless system 103. This value is initially set to zero, is incremented each time a call forwarding attempt is in progress for mobile unit 102, and is decremented each time a call forwarding attempt for mobile unit 102 ends.

Host wireless system 103 also determines the threshold number of simultaneous call forwarding attempts that are allowed for mobile unit 102. This is preferably done by retrieving a value that is stored at host wireless system 103. This value can be entered by the user of mobile unit 102 at registration, can be a default value, or can be a dynamic value that is based upon system utilization. For example, host wireless system 103 may increase the threshold value during periods of light utilization of host wireless system 103, but may decrease the value during peak usage of host wireless system 103.

If the current number of simultaneous call forwarding attempts does not exceed the threshold, home wireless system 103 sends call message 213 to visited wireless system 107. Call message 213 includes a plurality of fields, the relevant fields for the present invention including the TLDN for mobile unit 102, the V-MSCID field, the Electronic Serial Number (ESN) for mobile unit 102, a DMH redirection indicator, and the mobile unit identification field if different from the directory number. The V-MSCID field indicates the MSC to which mobile unit 102 is currently active.

Visited wireless system 107 then sends paging message 215 to mobile unit 102. Paging message 215 is a message sent over the air and is intended for mobile unit 102. Paging message 215 is utilized to alert mobile unit 102 of the incoming call intended for mobile unit 102.

In this embodiment, mobile unit 102 sends paging response message 217 to visited wireless system 107, and the call is completed.

Figure 3:
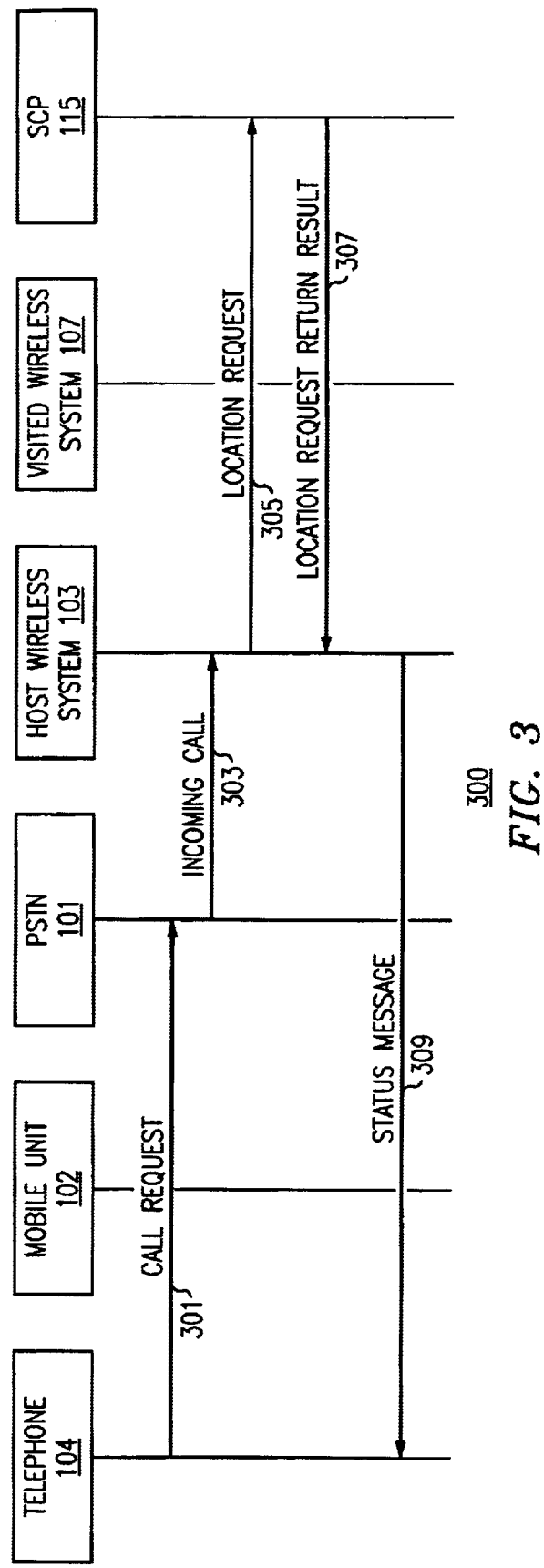
FIG. 3 depicts a ladder diagram of a method for limiting the number of simultaneous call forwarding attempts when a mobile unit is powered off in accordance with the preferred embodiment of the present invention.

FIG. 3 depicts a ladder diagram 300 of a method for limiting the number of simultaneous call forwarding attempts when a mobile unit is powered off in accordance with the preferred embodiment of the present invention.

Telephone 104 sends a call request 301 to PSTN 101 requesting a call for mobile unit 102. Call request 201 can be originated by either a wireline or wireless phone. Call request 301 includes the directory number of mobile unit 102.

PSTN 101 determines the wireless system to which it should send call request 301. Mobile unit 102 subscribed to host wireless system 103, and therefore all call requests for mobile unit 102 are routed to host wireless system 103. PSTN 101 therefore sends incoming call request 303 to host wireless system 103.

Host wireless system 103 then determines if mobile unit 102, which is subscribed to host wireless system 103, is within the coverage area of host wireless system 103. In this embodiment, since mobile unit 102 is powered off, home wireless system 103 will not have an active record for mobile unit 102. Home wireless system 103 will therefore send location request message 305 to SCP 115 located within FCN 105. Location request message 305 is a message that includes the directory number of the mobile unit and an O-MSCID field, which is an identifier of the MSC to which the call came in. Location request message 305 instructs SCP 115 to send the current location of mobile unit 102. Location request message 305 instructs SCP 115 to send the current location of mobile unit 102.

In this embodiment, SCP 115 determines that mobile unit 102 is not currently active at any wireless system. This can occur when mobile unit 102 is in an area that does not have cellular service, when mobile unit 102 is powered off, or when mobile unit 102 is not operational.

If wireless unit 102 is not active in any wireless system, SCP 115 sends location request location request return result message 307 to host wireless system 103. Location request return result message 307 includes an indicator that tells host wireless system 103 the reason that mobile unit 102 was not reachable, such as inactive, busy, or no answer.

Host wireless system 103 then determines whether to forward the call to the TLDN. To do this, host wireless system 103 determines the current number of simultaneous call forwarding attempts for mobile unit 102. This is preferably done by retrieving a value that is stored at host wireless system 103. This value is initially set to zero, is incremented each time a call forwarding attempt is in progress for mobile unit 102, and is decremented each time a call forwarding attempt for mobile unit 102 ends.

Host wireless system 103 also determines the threshold number of simultaneous call forwarding attempts that are allowed for mobile unit 102. This is preferably done by retrieving a value that is stored at host wireless system 103. This value can be entered by the user of mobile unit 102 are registration, can be a default value, or can be a dynamic value that is based upon system utilization. For example, host wireless system 103 may increase the threshold value during periods of light utilization of host wireless system 103, but may decrease the value during peak usage of host wireless system 103.

If the current number of simultaneous call forwarding attempts does not exceed the threshold, home wireless system 103, host wireless system 103 sends status message 309 to telephone 104, which alerts telephone 104 that the desired call request could not be completed.

Figure 4:
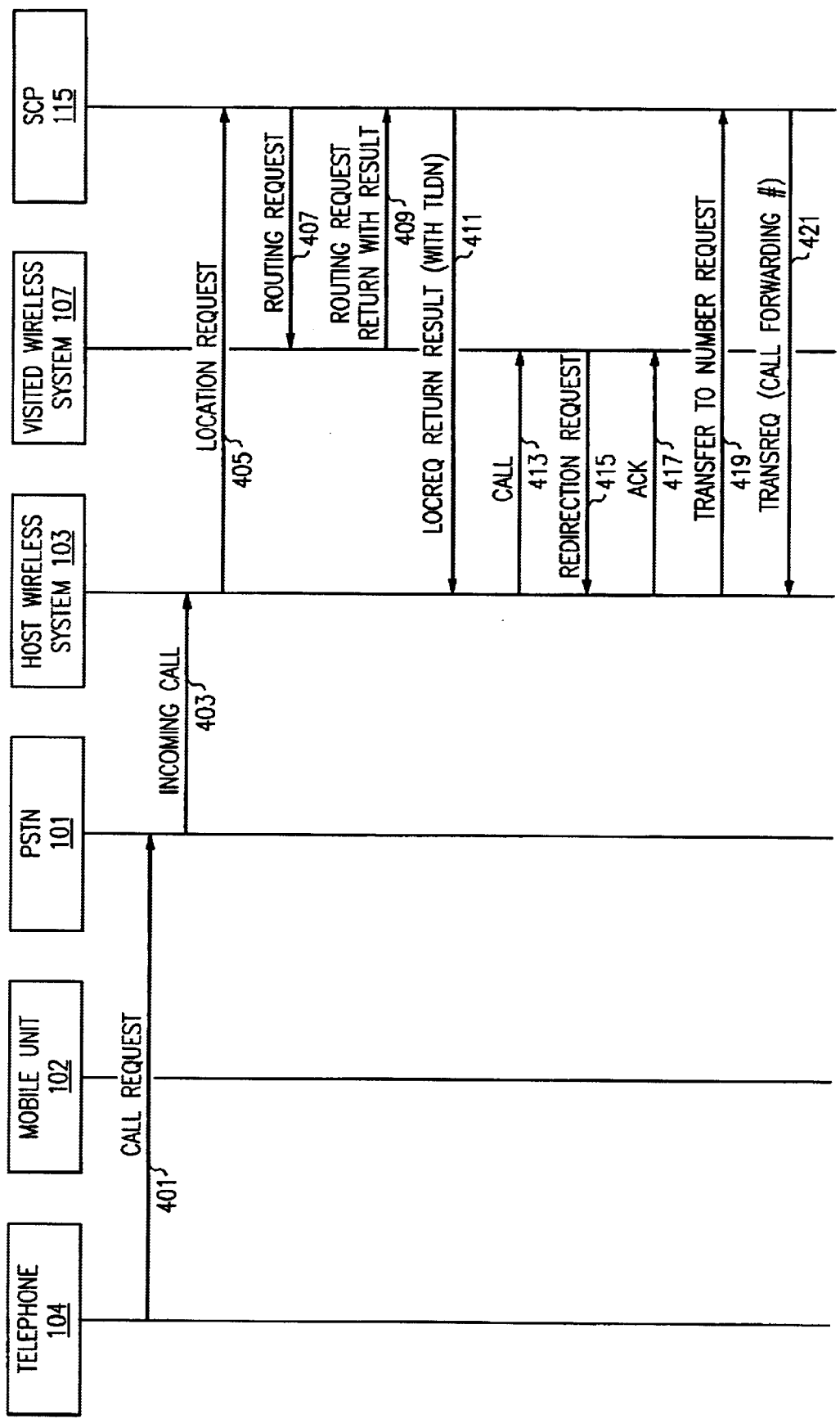
FIG. 4 depicts a ladder diagram of a method for limiting the number of simultaneous call forwarding attempts when a mobile unit does not answer a page request in accordance with the preferred embodiment of the present invention.

FIG. 4 depicts a ladder diagram 400 of a method for limiting the number of simultaneous call forwarding attempts when a mobile unit does not answer a page request in accordance with the preferred embodiment of the present invention.

Telephone 104 sends a call request 401 to PSTN 101 requesting a call for mobile unit 102. Call request 401 can be originated by either a wireline or wireless phone. Call request 401 includes the directory number of mobile unit 102.

PSTN 101 determines the wireless system to which it should send call request 401. Mobile unit 102 subscribed to host wireless system 103, and therefore all call requests for mobile unit 102 are routed to host wireless system 103. PSTN 101 therefore sends incoming call request 403 to host wireless system 103.

Host wireless system 103 then determines if mobile unit 102, which is subscribed to host wireless system 103, is within the coverage area of host wireless system 103. Host wireless system 103 preferably does this by checking HLR 145. If mobile unit 102 is within the coverage area of host wireless system 103, the call is completed between telephone 104 and mobile unit 102.

If mobile unit 102 has roamed to visited wireless system 107, host wireless system 103 sends location request message 405 to SCP 115 located within FCN 105. Location request message 405 is a message that includes the directory number of the mobile unit and an O-MSCID field, which is an identifier of the MSC to which the call came in. Location request message 405 instructs SCP 115 to send the current location of mobile unit 102.

SCP 115 determines that mobile unit 102 has roamed and is now located within the coverage area of visited wireless system 107. SCP 115 then sends routing request message 407 to visited wireless system 107. Routing request message 407 is a message requesting the temporary location directory number of mobile unit 102 while located within visited wireless system 107.

Visited wireless system 107 the sends routing request return result message 409 to SCP 115. Routing request return result message 409 includes the Temporary Location Directory Number (TLDN) for mobile unit 102. The TLDN is a number that is temporarily assigned to mobile unit 102 when mobile unit 102 has roamed to a coverage area outside of the coverage area of its home wireless system.

SCP 115 sends location request return result message 411 to home wireless system 103. Location request return result message 411 includes the TLDN for mobile unit 102.

Host wireless system 103 then determines whether to forward the call to the TLDN. To do this, host wireless system 103 determines the current number of simultaneous call forwarding attempts for mobile unit 102. This is preferably done by retrieving a value that is stored at host wireless system 103. This value is initially set to zero, is incremented each time a call forwarding attempt is in progress for mobile unit 102, and is decremented each time a call forwarding attempt for mobile unit 102 ends.

Host wireless system 103 also determines the threshold number of simultaneous call forwarding attempts that are allowed for mobile unit 102. This is preferably done by retrieving a value that is stored at host wireless system 103. This value can be entered by the user of mobile unit 102 are registration, can be a default value, or can be a dynamic value that is based upon system utilization. For example, host wireless system 103 may increase the threshold value during periods of light utilization of host wireless system 103, but may decrease the value during peak usage of host wireless system 103.

If the current number of simultaneous call forwarding attempts does not exceed the threshold, home wireless system 103 then sends call message 413 to visited wireless system 107. Call message 413 includes a plurality of fields, the relevant fields for the present invention including the TLDN for mobile unit 102, the V-MSCID field, the Electronic Serial Number (ESN) for mobile unit 102, a DMH redirection indicator, and the mobile unit identification field if different from the directory number. The V-MSCID field indicates the MSC to which mobile unit 102 is currently active.

Visited wireless system 107 sends redirection request 415 to host wireless system 103. Upon receiving this message, host wireless system 103 sends acknowledgement message 417 to visited wireless system 107.

Host wireless system 103 then sends transfer to number request 419 to SCP 115. SCP 115 responds with transfer request message 421, which is sent to host wireless system 103. Transfer request message 421 includes the call forwarding number for mobile unit 102.

Figure 5:
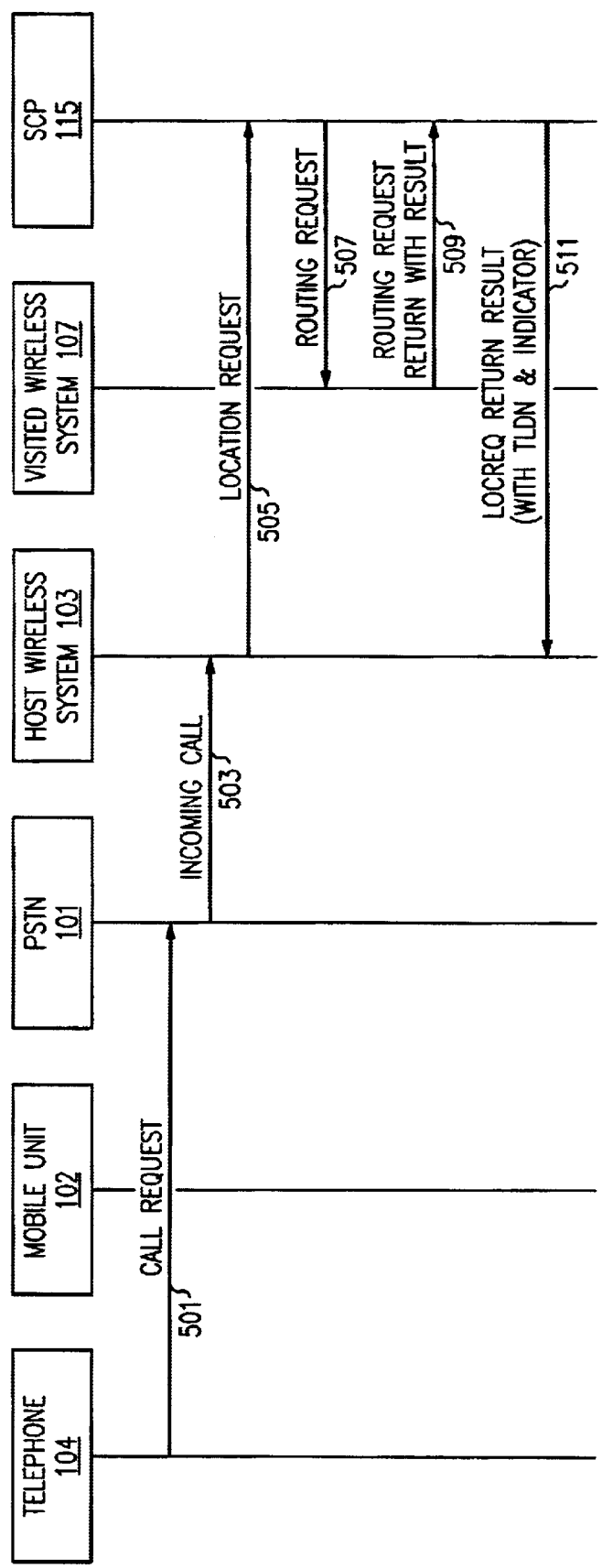
FIG. 5 depicts a ladder diagram of a method for limiting the number of simultaneous call forwarding attempts when a mobile unit is busy in accordance with the preferred embodiment of the present invention.

FIG. 5 depicts a ladder diagram 500 of a method for limiting the number of simultaneous call forwarding attempts when a mobile unit is busy in accordance with the preferred embodiment of the present invention.

Telephone 104 sends a call request 501 to PSTN 101 requesting a call for mobile unit 102. Call request 501 can be originated by either a wireline or wireless phone. Call request 501 includes the directory number of mobile unit 102.

PSTN 101 determines the wireless system to which it should send call request 501. Mobile unit 102 subscribed to host wireless system 103, and therefore all call requests for mobile unit 102 are routed to host wireless system 103. PSTN 101 therefore sends incoming call request 503 to host wireless system 103.

Host wireless system 103 then determines if mobile unit 102, which is subscribed to host wireless system 103, is within the coverage area of host wireless system 103. Host wireless system 103 preferably does this by checking HLR 145. If mobile unit 102 is within the coverage area of host wireless system 103, the call is completed between telephone 104 and mobile unit 102.

If mobile unit 102 has roamed to visited wireless system 107, host wireless system 103 sends location request message 505 to SCP 115 located within FCN 105. Location request message 505 is a message that includes the directory number of the mobile unit and an O-MSCID field, which is an identifier of the MSC to which the call came in. Location request message 505 instructs SCP 115 to send the current location of mobile unit 102.

SCP 115 determines that mobile unit 102 has roamed and is now located within the coverage area of visited wireless system 107. SCP 115 then sends routing request message 507 to visited wireless system 107. Routing request message 507 is a message requesting the temporary location directory number of mobile unit 102 while located within visited wireless system 107.

Visited wireless system 107 the sends routing request return result message 509 to SCP 115. Routing request return result message 509 includes the Temporary Location Directory Number (TLDN) for mobile unit 102. The TLDN is a number that is temporarily assigned to mobile unit 102 when mobile unit 102 has roamed to a coverage area outside of the coverage area of its home wireless system.

SCP 115 sends location request return result message 511 to home wireless system 103. Location request return result message 511 includes the TLDN for mobile unit 102.

Host wireless system 103 then determines whether to forward the call to the TLDN. To do this, host wireless system 103 determines the current number of simultaneous call forwarding attempts for mobile unit 102. This is preferably done by retrieving a value that is stored at host wireless system 103. This value is initially set to zero, is incremented each time a call forwarding attempt is in progress for mobile unit 102, and is decremented each time a call forwarding attempt for mobile unit 102 ends.

Host wireless system 103 also determines the threshold number of simultaneous call forwarding attempts that are allowed for mobile unit 102. This is preferably done by retrieving a value that is stored at host wireless system 103. This value can be entered by the user of mobile unit 102 are registration, can be a default value, or can be a dynamic value that is based upon system utilization. For example, host wireless system 103 may increase the threshold value during periods of light utilization of host wireless system 103, but may decrease the value during peak usage of host wireless system 103.

If the current number of simultaneous call forwarding attempts does not exceed the threshold, home wireless system 103 forwards the call to the TLDN.

Thus, the present invention provides a method that solves a problem associated with the prior art. The present invention provides a method for limiting the number of simultaneous call forwarding attempts for a mobile unit. Upon receiving the call forwarding number from the SCP, the MSC associated with the mobile unit will determine if the maximum number of simultaneous call forwarding attempts for the mobile unit has been exceeded. If not, the MSC will forward the call to the call forwarding number received from the SCP. If the number of simultaneous call forwarding attempts allowed is met or has been exceeded, the MSC does not forward the call to the call forwarding number received from the SCP. In this manner, the present invention conserves system resources by limiting the number of simultaneous call forwarding attempts by a mobile unit.

While this invention has been described in terms of certain examples thereof, it is not intended that it be limited to the above description, but rather only to the extent set forth in the claims that follow.

We claim:

1. A method for limiting the number of simultaneous call forwarding attempts for a mobile unit in a communication system, the method comprising the steps of:

receiving a call request at a host wireless system for the mobile unit;

determining the maximum number of simultaneous call forwarding attempts permitted for the mobile unit; and forwarding the call request if the maximum number of simultaneous call forwarding attempts for the mobile unit has not been exceeded, wherein the maximum number of simultaneous call forwarding attempts for the mobile unit is dynamically determined, based upon current system loading information.

2. A method for limiting the number of simultaneous call forwarding attempts for a mobile unit in accordance with claim 1, wherein the step of receiving a call request at the host wireless system for the mobile unit comprises receiving a call request for the mobile unit while the mobile unit is not registered at the host wireless system.

3. A method for limiting the number of simultaneous call forwarding attempts for a mobile unit in accordance with claim 2, the method further comprising the step of limiting the number of simultaneous call forwarding attempts when a mobile unit responds to a call request.

4. A method for limiting the number of simultaneous call forwarding attempts for a mobile unit in accordance with claim 2, the method further comprising the step of limiting the number of simultaneous call forwarding attempts when a mobile unit is powered off.

5. A method for limiting the number of simultaneous call forwarding attempts for a mobile unit in accordance with claim 2, the method further comprising the step of limiting the number of simultaneous call forwarding attempts when a mobile unit does not answer a page request.

6. A method for limiting the number of simultaneous call forwarding attempts for a mobile unit in accordance with claim 2, the method further comprising the step of limiting the number of simultaneous call forwarding attempts when a mobile unit is busy.

7. A method for limiting the number of simultaneous call forwarding attempts for a mobile unit in accordance with claim 1, wherein the maximum number of simultaneous call forwarding attempts permitted for the mobile unit is a predetermined number.

8. A method for determining whether to forward a call to a mobile unit that is registered with a host wireless system, the method comprising the steps of:

determining the current number of simultaneous call forwarding attempts for the mobile unit;

determining the threshold number of simultaneous call forwarding attempts that are allowed for the mobile unit based upon current system utilization; and forwarding the call to the mobile unit if the current number of simultaneous call forwarding attempts for the mobile unit is less than the threshold number of simultaneous call forwarding attempts that are allowed for the mobile unit.

9. A method for determining whether to forward a call to a mobile unit in accordance with claim 8, wherein the step of determining the current number of simultaneous call forwarding attempts for the mobile unit is done by the host wireless system.

10. A method for determining whether to forward a call to a mobile unit in accordance with claim 8, wherein the step of determining the current number of simultaneous call forwarding attempts for the mobile unit comprises retrieving a value that is stored at the host wireless system.

11. A method for determining whether to forward a call to a mobile unit in accordance with claim 8, further comprising the step of initializing the current number of simultaneous call forwarding attempts for the mobile unit.

12. A method for determining whether to forward a call to a mobile unit in accordance with claim 11, further comprising the step of incrementing the current number of simultaneous call forwarding attempts each time a call forwarding attempt is in progress for the mobile unit.

13. A method for determining whether to forward a call to a mobile unit in accordance with claim 12, further comprising the step of decrementing the current number of simultaneous call forwarding attempts each time a call forwarding attempt for the mobile unit ends.

14. A method for determining whether to forward a call to a mobile unit in accordance with claim 8, wherein the step of determining the threshold number of simultaneous call forwarding attempts is done by the host wireless system.

15. A method for determining whether to forward a call to a mobile unit in accordance with claim 8, wherein the step of determining the threshold number of simultaneous call forwarding attempts comprises retrieving a value that is stored at the host wireless system.

16. A method for determining whether to forward a call to a mobile unit in accordance with claim 8, wherein the step of determining the threshold number of simultaneous call forwarding attempts comprises entering a value at the registration of the mobile unit with the home wireless system.

17. A method for determining whether to forward a call to a mobile unit in accordance with claim 8, wherein the step of determining the threshold number of simultaneous call forwarding attempts comprises retrieving a default value.

18. A method for determining whether to forward a call to a mobile unit in accordance with claim 8, wherein the threshold number of simultaneous call forwarding attempts is increased during periods of light utilization of the host wireless system.

19. A method for determining whether to forward a call to a mobile unit in accordance with claim 8, wherein the threshold number of simultaneous call forwarding attempts is decreased during periods of peak usage of the host wireless system.

* * * * *